United States Patent
Warner et al.

(10) Patent No.: US 7,873,645 B2
(45) Date of Patent: Jan. 18, 2011

(54) METHOD AND MECHANISM FOR HANDLING ARBITRARILY-SIZED XML IN SQL OPERATOR TREE

(75) Inventors: James W. Warner, Mountain View, CA (US); Muralidhar Krishnaprasad, Fremont, CA (US); Anand Manikutty, Foster City, CA (US); Zhen Liu, San Mateo, CA (US); Ravi Murthy, Fremont, CA (US); Susan Kotsovolos, San Carlos, CA (US); Vikas Arora, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 763 days.

(21) Appl. No.: 10/656,800

(22) Filed: Sep. 5, 2003

(65) Prior Publication Data

US 2005/0055338 A1    Mar. 10, 2005

(51) Int. Cl.
G06F 7/00        (2006.01)
G06F 17/30      (2006.01)

(52) U.S. Cl. .................. 707/758; 707/769; 707/775; 707/778

(58) Field of Classification Search .................. 707/3
See application file for complete search history.

(56) References Cited

U.S. PATENT DOCUMENTS

| | | | |
|---|---|---|---|
| 5,455,945 A | | 10/1995 | VanderDrift |
| 6,470,344 B1 * | | 10/2002 | Kothuri et al. .............. 707/100 |
| 6,662,342 B1 | | 12/2003 | Marcy |
| 6,665,663 B2 * | | 12/2003 | Lindsay et al. ................. 707/4 |
| 6,671,853 B1 * | | 12/2003 | Burkett et al. ............... 715/513 |
| 6,678,672 B1 * | | 1/2004 | Ramasamy et al. ............ 707/2 |
| 6,678,686 B1 * | | 1/2004 | Patel et al. .................. 707/100 |
| 6,708,164 B1 * | | 3/2004 | Cseri et al. ..................... 707/4 |
| 6,742,054 B1 | | 5/2004 | Upton |
| 6,799,184 B2 * | | 9/2004 | Bhatt et al. .................. 707/102 |
| 6,832,219 B2 | | 12/2004 | Lal et al. |

(Continued)

FOREIGN PATENT DOCUMENTS

WO      01/42881 A2     6/2001

OTHER PUBLICATIONS

"XQuery from the Experts: A Guide to the W3C XML Query Language", by Howard Katz et al., Aug. 2003, ISBN: 0-321-18060-7, chapters 6 & 7.*

(Continued)

*Primary Examiner*—Jay A Morrison
(74) *Attorney, Agent, or Firm*—Vista IP Law Group, LLP.

(57) ABSTRACT

Disclosed is a method and mechanism for processing expressions and operator trees. An approach is particularly useful to optimize processing of XML statements with respect to SQL operators. A top-down processing approach can be taken to directly output data from operators to a data stream. In addition, multiple processing approaches can be taken within a single expression tree, with some operators processed using the top-down approach and other operators processed with the bottom-up approach. Even data that can not be streamed is copied fewer times using this approach, intermediate values from bottom-up processing may still be streamed if it is used by an operator that is eligible for top-down processing.

43 Claims, 17 Drawing Sheets

U.S. PATENT DOCUMENTS

| | | | |
|---|---|---|---|
| 7,213,017 B2* | 5/2007 | Rys et al. | 707/4 |
| 2001/0029604 A1 | 10/2001 | Dreyband et al. | |
| 2002/0073399 A1 | 6/2002 | Golden | |
| 2002/0143521 A1 | 10/2002 | Call | |
| 2002/0156811 A1 | 10/2002 | Krupa | |
| 2002/0188613 A1* | 12/2002 | Chakraborty et al. | 707/100 |
| 2003/0014393 A1* | 1/2003 | Kabra et al. | 707/3 |
| 2003/0037048 A1* | 2/2003 | Kabra et al. | 707/4 |
| 2003/0074419 A1 | 4/2003 | VanderDrift | |
| 2003/0101169 A1* | 5/2003 | Bhatt et al. | 707/3 |
| 2003/0233618 A1 | 12/2003 | Wan | |
| 2004/0060007 A1* | 3/2004 | Gottlob et al. | 715/513 |
| 2004/0068487 A1* | 4/2004 | Barton et al. | 707/3 |
| 2004/0103105 A1 | 5/2004 | Lindblad et al. | |
| 2005/0273703 A1 | 12/2005 | Doughan | |
| 2005/0278358 A1 | 12/2005 | Doughan | |

OTHER PUBLICATIONS

"XQuery from the Experts: A Guide to the W3C XML Query Language", by Howard Katz et al., Aug. 2003, ISBN: 0-321-18060-7, publication information pages, copyright information pages.*

McHugh et al., "Query Optimization for XML", Proceedings of the 25th VLDB Conference, Edinburgh Scotland, 1999.*

"Burg—Fast Optimal Instruction Selection and Tree Parsing", by Fraser et al., ACM SIGPLAN Notices, vol. 27, No. 4, Apr. 1992.*

"Better XML Parser through Functional Programming", by Kiselyov, Lecture Notes in Computer Science, vol. 2257 archive, Proceedings of the 4th International Symposium on Practical Aspects of Declarative Languages, pp. 209-224, Year of Publication: 2002, ISBN:3-540-43092-X.*

Bruno, N. et al., "*Holistic Twig Joins: Optimal XML Pattern Matching*", Proceedings of the 2002 ACM SIGMOD International Conference on Management of Data SIGMOD '02, Jun. 2002, pp. 310-321, ACM Press, USA.

Chaudhuri, S. et al., "*On Relational Support for XML Publishing: Beyond Sorting and Tagging*", Proceedings of the 2003 ACM SIGMOD International Conference on Management of Data, Jun. 2003, ACM Press, USA.

Damiani, E. et al., "*A Fine-Grained Access Control System for XML Documents*", ACM Transactions on Information and System Security (TISSEC), May 2002, pp. 169-202, vol. 5, Issue 2, ACM Press.

DeHaan, D. et al., "*A Comprehensive XQuery to SQL Translation Using Dynamic Interval Encoding*", Proceedings of the 2003 ACM SIGMOD International Conference on Management of Data, Jun. 2003, pp. 623-634, ACM Press, USA.

Fiebig, T. et al., "*Algebraic XML Construction and its Optimization in Natix*", World Wide Web, Jan. 2002, pp. 167-187, vol. 3, Issue 4, Kluwer Academic Publishers, The Netherlands.

Flesca, S. et al., "*A Query Language for XML Based on Graph Grammars*", World Wide Web, Aug. 2002, pp. 125-157, vol. 5, Issue 2, Kluwer Academic Publishers, The Netherlands.

Funderburk, J. et al., "*XML Programming with SQL/XML and XQuery*", IBM Systems Journal, Oct. 2002, pp. 642-665, vol. 41, No. 4, IBM Corporation, USA.

Ives, Z. et al., "*An XML Query Engine for Network-Bound Data*", The VLDB Journal—The International Journal on Very Large Data Bases, Dec. 2002, pp. 380-402, vol. 11, Issue 4, Springer-Verlag New York, Inc., USA.

Jiang, H. et al., "*Path Materialization Revisited: An Efficient Storage Model for XML Data*", Australian Computer Science Communications, Proceedings of the 13$^{th}$ Australasian Database Conference, Jan. 2002, pp. 85-94, vol. 24, Issue 2, Australian Computer Society, Inc., and the IEEE Computer Society Press, Australia.

Lee, D. et al., "*NeT & CoT: Translating Relational Schemas to XML Schemas Using Semantic Constraints*", Proceedings of the 11$^{th}$ International Conference on Information and Knowledge Management, Nov. 2002, pp. 282-291, ACM Press, USA.

Li, C. et al., "*Composing XSL Transformations with XML Publishing Views*", Proceedings of the 2003 ACM SIGMOD International Conference on Management of Data, Jun. 2003, pp. 515-526, ACM Press, USA.

Li, X. et al., "*Compiler Support for Efficient Processing of XML Datasets*", Proceedings of the 17$^{th}$ Annual International Conference on Supercomputing, Jun. 2003, pp. 42-52, ACM Press, USA.

Papakonstantinou, Y. et al., "*QURSED: Querying and Reporting Semistructured Data*", Proceedings of the 2002 ACM SIGMOD International Conference on Management of Data SIGMOD '02, Jun. 2002, ACM Press, USA.

Shanmugasundaram, J. et al., "*Efficiently Publishing Relational Data as XML Documents*", The International Journal on Very Large Data Bases, Sep. 2001, pp. 133-154, vol. 10, Issue 2-3, Springer-Verlag New York, Inc., USA.

Tatarinov, I. et al., "*Storing and Querying Ordered XML Using a Relational Database System*", Proceedings of the 2002 ACM SIGMOD International Conference on Management of Data SIGMOD '02, Jun. 2002, ACM Press, USA.

Wong, R., "The Extended XQL for Querying and Updating Large XML Database", Proceedings of the 2001 ACM Symposium on Document Engineering, Nov. 2001, pp. 95-104, ACM Press, USA.

Yoshikawa, M. et al., "XREL: A Path-Based Approach to Storage and Retrieval of XML Documents Using Relational Databases", ACM Transactions on Internet Technology (TOIT), Aug. 2001, pp. 110-141, vol. 1, Issue 1, ACM Press, USA.

Zhang, X. et al., "*Honey, I Shrunk the XQuery!—An XML Algebra Optimization Approach*", Proceedings of the 4$^{th}$ International Workshop on Web Information and Data Management, Nov. 2002, pp. 15-22, ACM Press, USA.

Fialli et al. "Java Architecture for XML Binding JAXB)" Jan. 8, 2003, Sun Microsystems, pp. 58 and 74.

Kudrass, T. "Management of XML documents without schema in relational database systems" Information and Software Techology (Mar. 31, 202) 44(4):269-275.

Noga et al. "Lazy XML Processing" Nov. 2002, ACM, pp. 88-94.

Tian et al. "The Design and Performance Evaluation of Alternative XML Storage Strategies" Mar. 2002, pp. 5-10.

Borstein, N.; "Pull Parsing in C# and Java"; May 22, 2002; pp. 1-9; XLM.Com.

* cited by examiner

Fig. 3B

| Node | Action |
|---|---|
| 302 | - One or more Child Operator Nodes?<br>Answer: Yes, at Node 304<br>- Child Operator Node 304 eligible for Top-Down Processing?<br>Answer: Yes<br>Action: Proceed to Node 304 and Recursively begin process |
| 304 | - One or more Child Operator Nodes?<br>Answer: Yes, at Node 306<br>- Child Operator Node 306 eligible for Top-Down Processing?<br>Answer: Yes<br>Action: Proceed to Node 306 and Recursively begin process |
| 306 | - One or more Child Operator Nodes?<br>Answer: No<br>Action: Process Operation for Node 306 and return result to stream<br><br>Concat('ABC', 'DEF') ⇒ Return 'ABCDEF' to Stream<br><br>Action: Return back to processing for Node 304 |
| 304 | - Any more Child Operator Nodes?<br>Answer: No<br>Action: Process Operation for Node 304 and return result to stream<br><br>Concat(Data already in stream, 'HIJ') ⇒ Concat 'HIJ' to data already in Stream<br><br>Action: Return back to processing for Node 302 |
| 302 | - Any more Child Operator Nodes?<br>Answer: Yes, at Node 308<br>- Child Operator Node 308 eligible for Top-Down Processing?<br>Answer: No<br>Action: Proceed to Node 308 and Perform Bottom-Up Processing |
| 308 | Action: Process Operation for Node 308 and return result to Node 302<br><br>1 + 2 ⇒ Return value of 3<br><br>Action: Return back to processing for Node 302 |
| 302 | Action: Finish Operation for Node 302 and return result to Stream<br><br>Concat(Data already in stream, 3) ⇒ Concat 3 to data already in Stream |

Fig. 6A   Begin Top Down Evaluation of Expression Tree 500
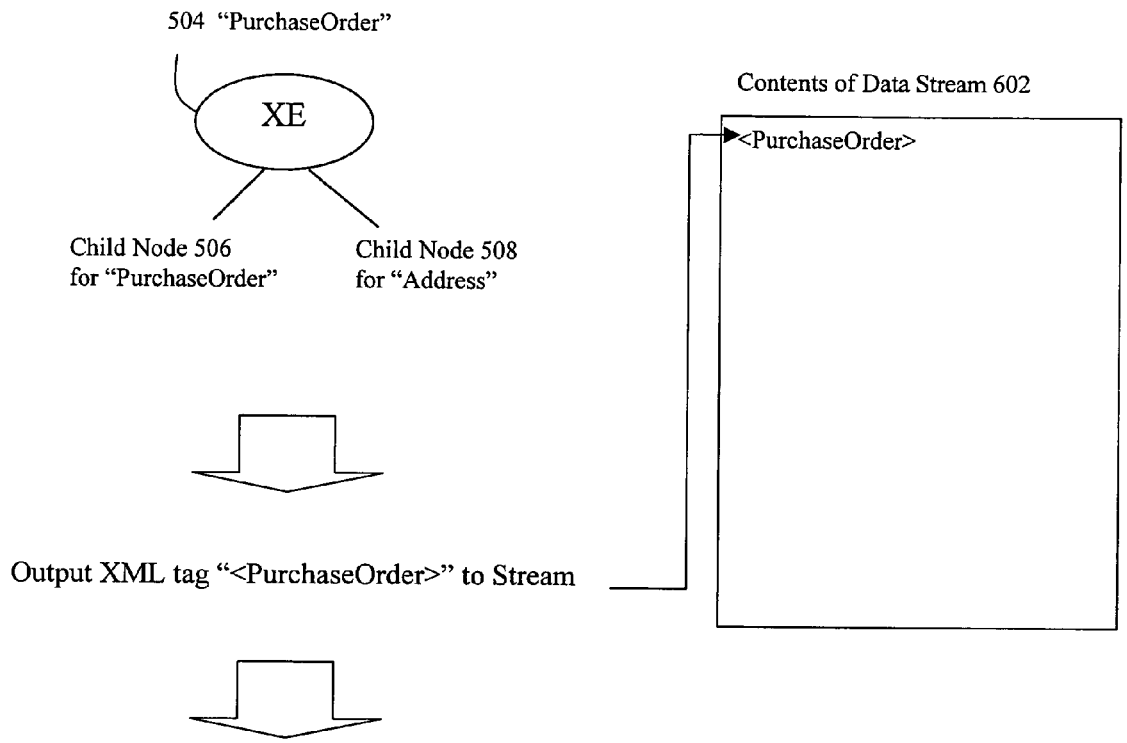

Fig. 6D  Begin Evaluating Node 508 for "Address"
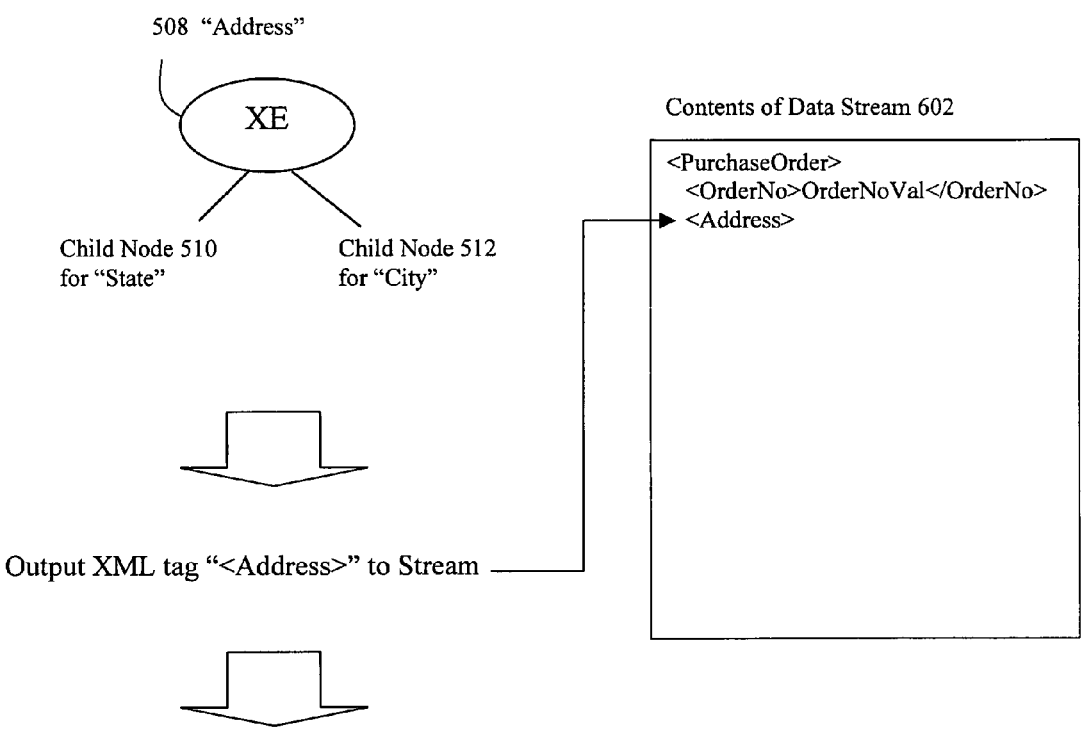
Proceed to Fig. 6E to Evaluate Child Node 510

Fig. 6E    Begin Evaluating Node 510 for "State"
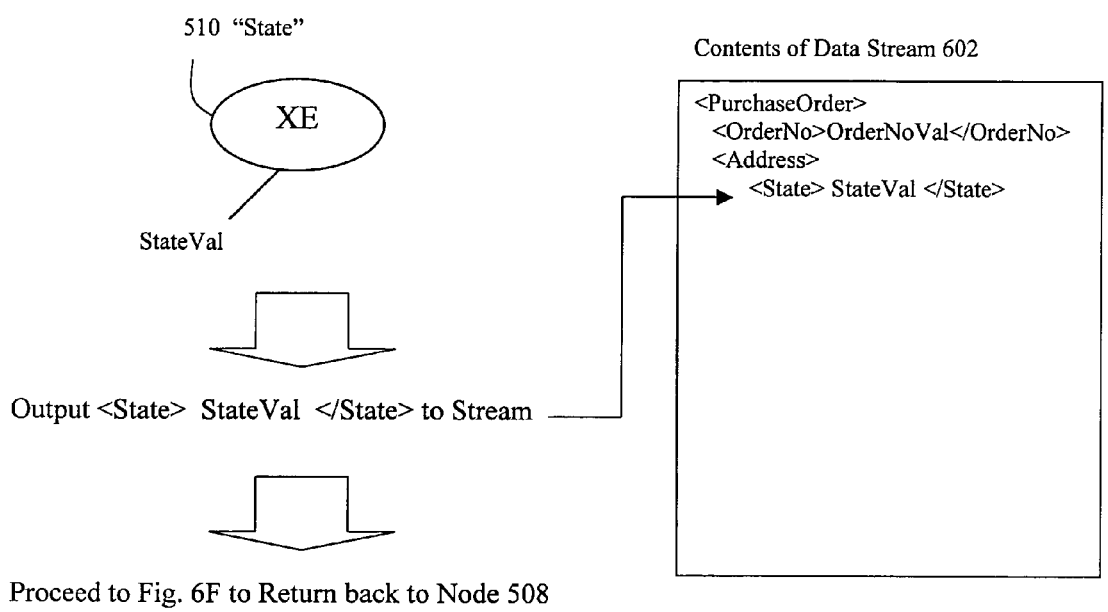

Fig. 6F    Return back to Node 508 for "Address"
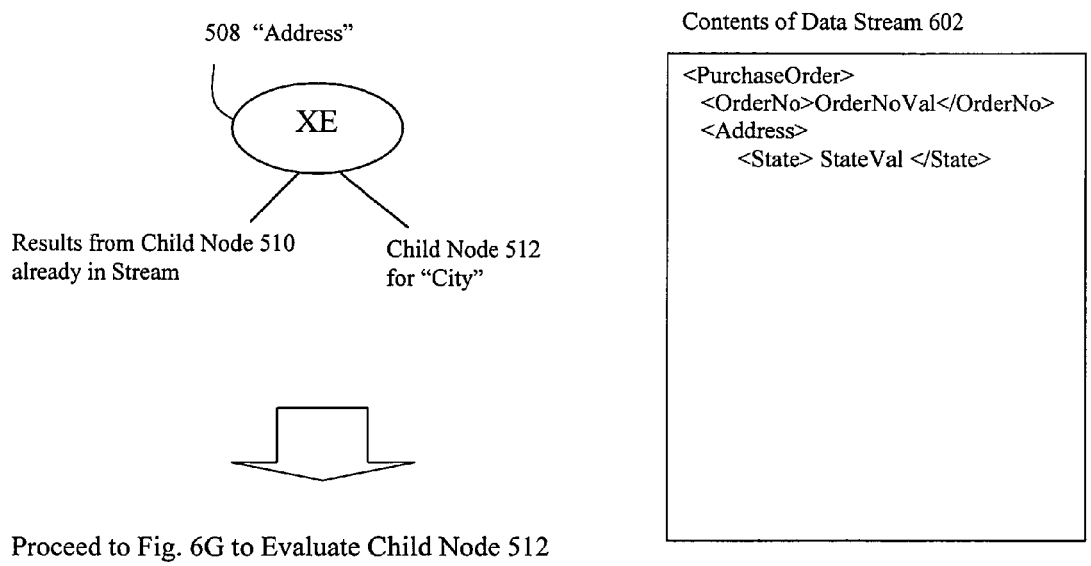
Proceed to Fig. 6G to Evaluate Child Node 512

Fig. 6G     Begin Evaluating Node 512 for "City"
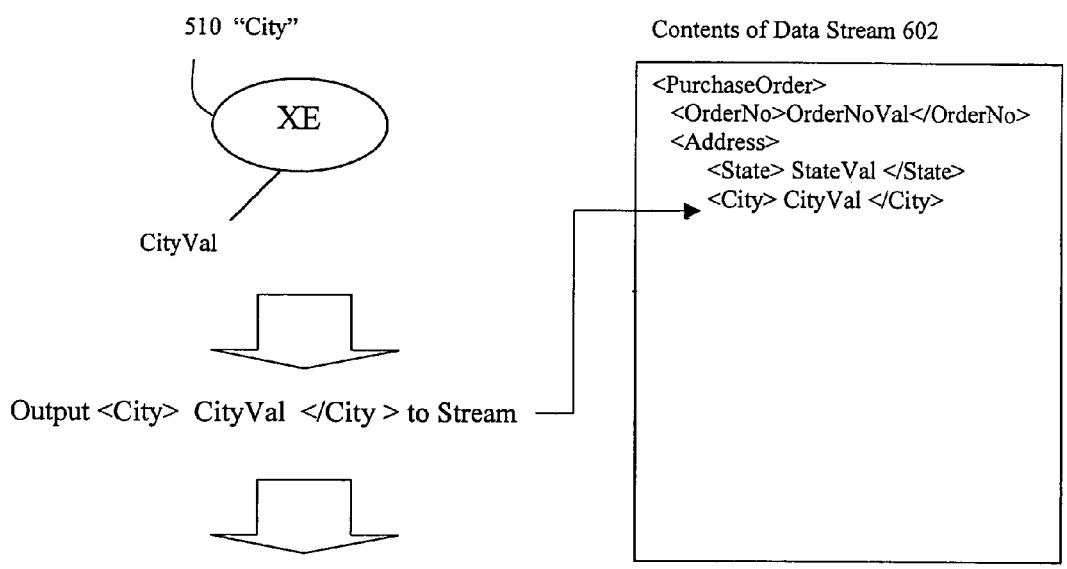

Fig. 6H    Finish Evaluating Node 508 for "Address"
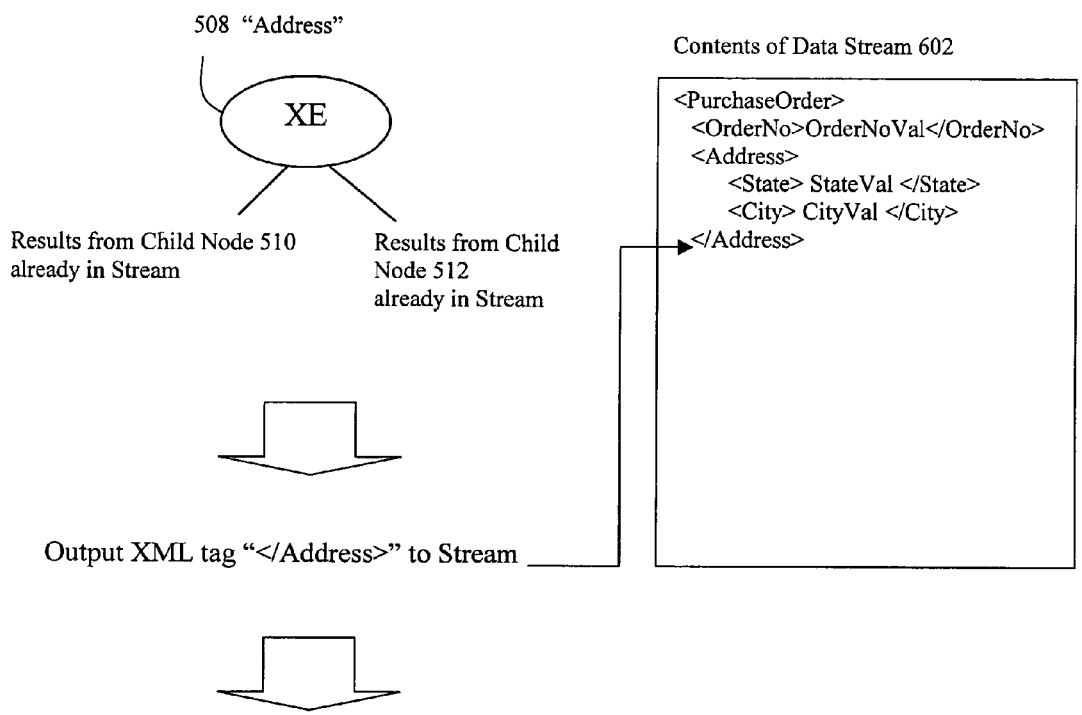
Proceed to Fig. 6I to Return back to Node 504

Fig. 6I    Finish Top Down Evaluation of Expression Tree 500
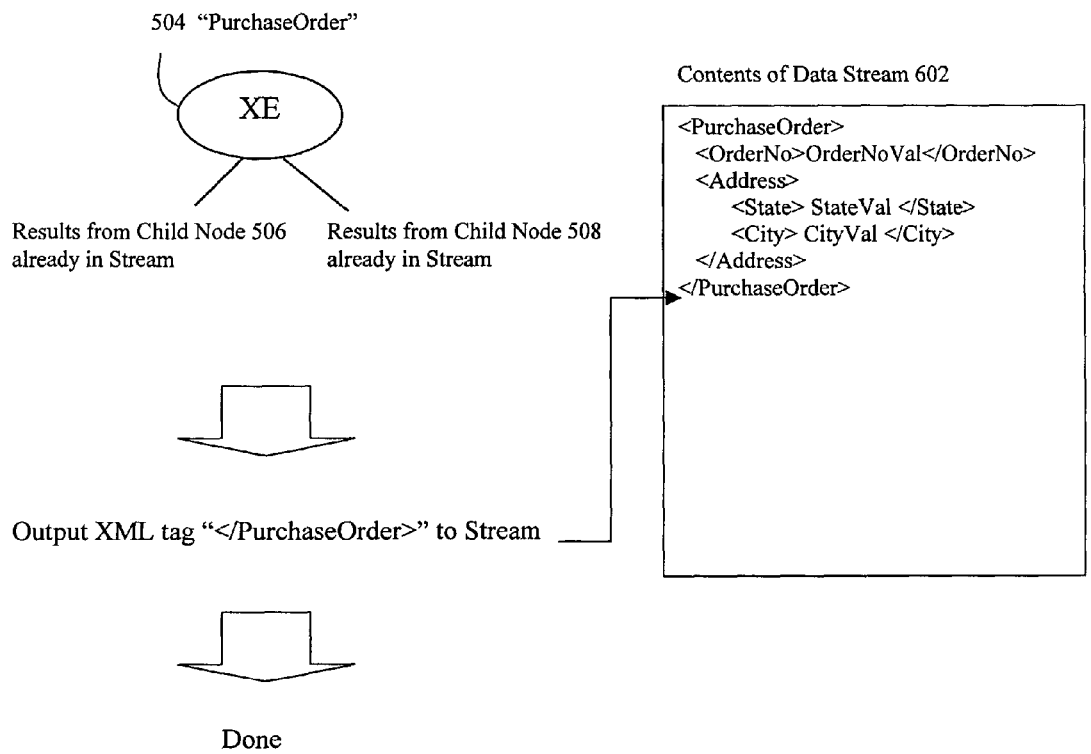

METHOD AND MECHANISM FOR HANDLING ARBITRARILY-SIZED XML IN SQL OPERATOR TREE

BACKGROUND AND SUMMARY

The invention relates to a method and mechanism for efficiently accessing and generating data for a set of operators. In addition, an embodiment of the invention relates to a method and mechanism for efficiently accessing and generating arbitrarily-sized XML in a SQL operator tree.

In the computing context, operators act upon one or more inputs to perform arithmetic and/or logic tasks. To illustrate a very simple example, consider the following expression:

(a+b)−c

This expression contains two operators. The operator '+' performs an addition function. The operator '−' performs a subtraction function.

Requirements may exist regarding the order in which the operators are evaluated in an expression. In some cases, the order of operation is implicit based upon the types of operators present in a statement, the left-right ordering of operators in a statement, and upon the relative/default ordering that is specified by a given system. The ordering of operators is important if there is a possibility of side effects if the operators are evaluated in a different order. In addition, the expression may contain an explicit indication of the order in which operators are evaluated. For example, in the sample expression above, the '(' and ')' symbols explicitly indicate that the content between these symbols (i.e., the 'a+b' operation) should be performed first, with the results subsequently used to evaluate with the '−c' operation. Therefore, for this example expression, the first operator '+' performs an addition function upon the values of 'a' and 'b'. The second operator '−' subtracts the value of 'c' from the result of the '+' operation.

FIG. 1 shows an expression tree 100 (also called an operator tree) that is associated with this expression. The highest level of the tree is the node 102 representing the '−' operator. Extending into node 102 from the left side is the output from the child node 104 representing the '+' operator. Extending into node 102 from the other side is the child node 106 representing the 'C' value. Drilling down lower into this expression tree, it can be seen that branching into node 104 from the left side is the child node 108 representing the 'A' value. Branching into the node 104 from the right side is the child node 110 representing the 'B' value.

The typical approach for processing this type of expression tree is to use "bottom-up" evaluations of operators. With the bottom-up approach, the lower levels of the expression tree are processed first, with the intermediate results propagated upward as each higher level of the expression tree is subsequently evaluated. The bottom-up approach is used to ensure that the correct order of evaluation is followed. In the example expression tree 100 of FIG. 1, this means that the operator at node 104 is evaluated first based upon inputs from 108 and 110. The intermediate result from the operator at node 104 is propagated upwards to be evaluated by the operator at node 102 along with the input from 106. The output from node 102 is the final result (unless this expression tree 100 is a sub-tree to a larger expression tree, in which case the out put from node 102 becomes an intermediate result that is itself propagated upwards to one or more other higher levels).

When processing expression trees using the bottom-up approach, each set of intermediate results from lower levels of the tree may be buffered into temporary storage locations so that they can be accessed and used by operators at higher levels of the tree. A problem with this approach is that the requirement to store the intermediate results into buffers could be relatively expensive, particularly for complex expressions when there are multiple levels of operators that will require multiple levels of buffers.

Moreover, if some or all of the intermediate results stay unchanged when moving up the hierarchy of operator levels, then the same set of data may be copied over and over again while the expression tree is being evaluated. Creating these multiple copies could be expensive, particularly if the data size increases while progressing up the levels of the expression tree.

An example of how this problem occur in the real world exists with respect to the desire of many modern computing systems to add XML functionality to be able to create, store, and retrieve data in the form of XML from relational or object-relational databases. XML (the "extensible markup language") is a meta-language developed and standardized by the World Wide Web Consortium (W3C) that permits use and creation of customized markup languages for different types of documents. XML is a variant of and is based on the Standard Generalized Markup Language (SGML), the international standard meta-language for text markup systems that is also the parent meta-language for the Hyper-Text Markup Language (HTML). Since its adoption as a standard language, XML has become widely used to describe and implement many kinds of document types.

SQL/XML is a standard that lays out a set of operators for generating XML from a relational database. For example, SQL/XML defines a standard API call, referred to as XMLElement( ), that acts as an operator to generate a XML statement from a data input. However, when this type of operator is used to generate XML, multiple levels of nesting may occur because of the types of data that is being generated. When using the bottom-up approach to handle an expression tree corresponding to this nesting of XMLElement( ) operators, it is quite possible that the same data will be copied, buffered, and propagated through multiple levels of the expression tree. Therefore, if there are ten levels of nesting in the operator tree, ten copies of the lowest-level data is generated, buffered, and copied, with nine additional copies at the next highest level, and eight additional copies at the next highest level, etc. As is evident, this type of approach could be quite inefficient.

The present invention provides an improved method and mechanism for processing expressions and operator trees. An embodiment of the invention is particularly useful to optimize processing of XML statements with respect to SQL operators. A top-down processing approach can be taken to directly output data from operators to a data stream. In addition, multiple processing approaches can be taken within a single expression tree, with some operators processed using the top-down approach and other operators processed with the bottom-up approach. Even data that cannot be streamed is copied fewer times using this approach, and intermediate values from bottom-up processing may still be streamed if it is used by an operator that is eligible for top-down processing.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using like reference numbers.

FIG. 3B illustrates the application of the process of FIG. 2 to the expression tree of FIG. 3A.

FIG. 6A-I illustrates the application of the process of FIG. 4 to the expression tree of FIG. 5.

DETAILED DESCRIPTION

The present invention provides a method and mechanism for efficiently accessing and generating data for a set of operators. In addition, an embodiment of the invention relates to a method and mechanism for efficiently accessing and generating arbitrarily-sized XML in a SQL operator tree.

According to a first embodiment of the invention, the present method creates a stream to which operator results will be placed. This stream could be built on top of, for example, a buffer, a LOB (large object), or another type of stream such as an HTTP stream. Examples of other types of streams that could be built upon include a segmented array, data socket, pipe, files, and networking/internet streams such as an FTP stream. The operators are evaluated in a top-down, depth-first manner, each outputting to this stream. In this manner, wasteful copies of data are avoided and performance is significantly improved.

Figure 1:
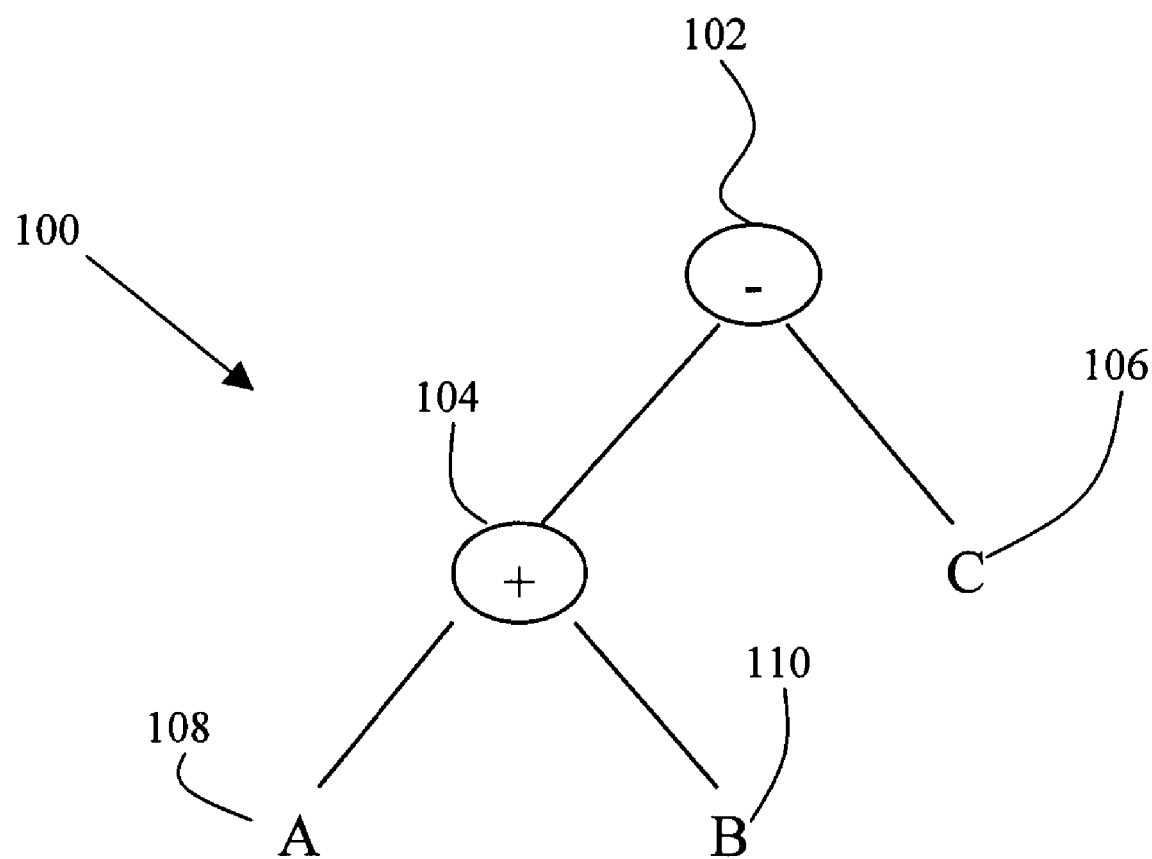
FIG. 1 shows an example expression tree.
Figure 2:
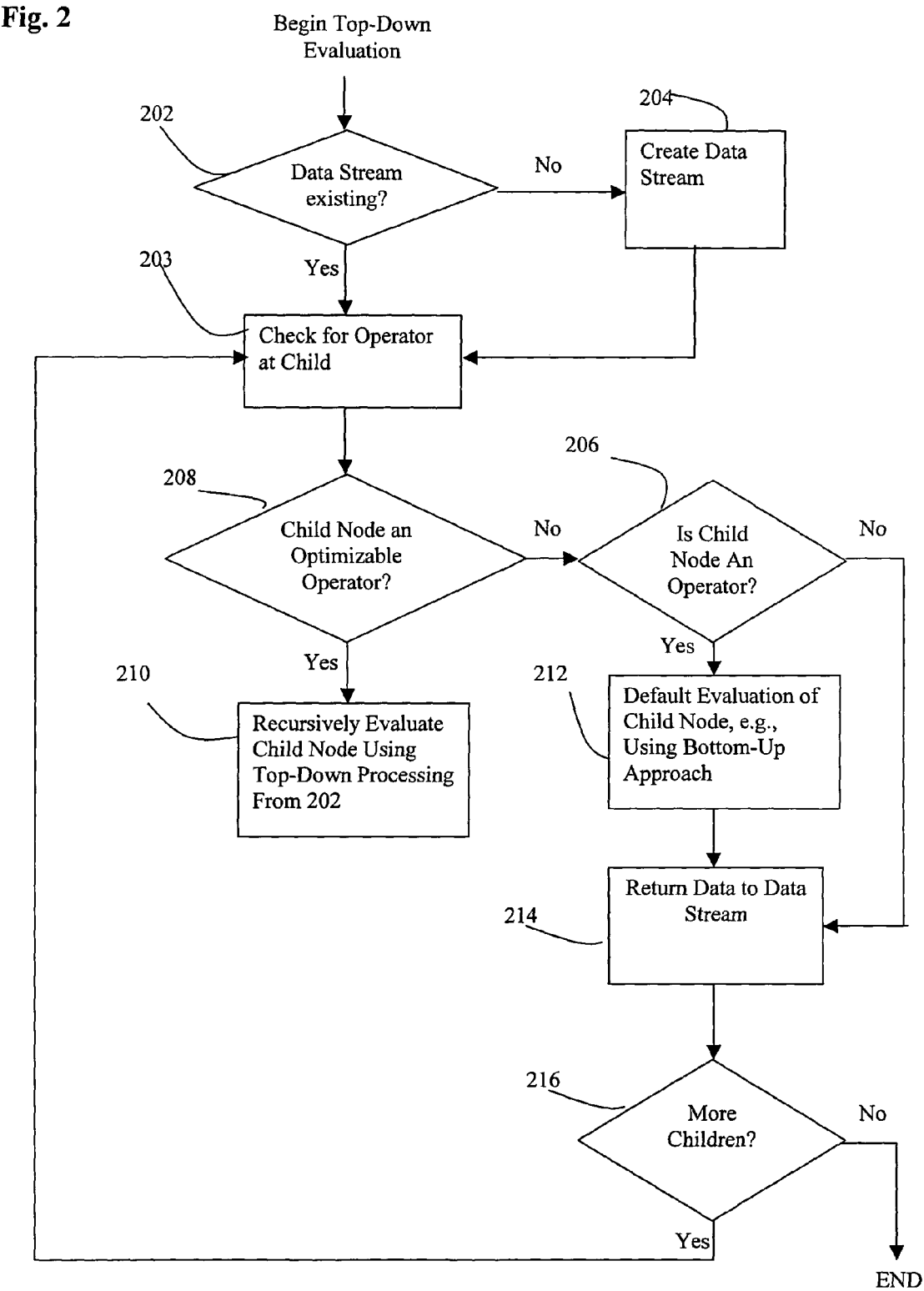
FIG. 2 depicts a flowchart of a process for processing an expression according to an embodiment of the invention.

FIG. 2 shows a flowchart of a process for evaluating an expression tree according to an embodiment of the invention. At 202, a determination is made whether an already-existing data stream has been identified to the evaluation function. If not, then a new data stream is created at 204. This type of identification for an already-existing data stream will be passed in, for example, if the evaluation function is being recursively called by another execution of the evaluation function at a different level of the expression tree.

At 203, a child of the operator is identified and reviewed. The specific ordering in which the child nodes of the operator are reviewed is subject to the type and content of the particular expression under review, as well as the configuration and requirements of the system to which the invention is directed. Based upon whatever order is required for the expression, a first child node is selected at 203.

A determination is made whether the selected child node corresponds to an optimizable operator (208). According to one approach, an example category of such optimizable operators are operators which can be evaluated in a top-down manner. If the selected operator is an optimizable operator, then a new execution of the process (beginning again at 202) is implemented for that child operator. In effect, the operator is called with the present process and the present data stream is passed in. This can be implemented such that the present process is recursively called for the child operator with the present stream passed to the recursive execution. As is clear to those skilled in the art, the present process is not restricted to recursive processing, since other approaches known in the art can be taken to provide a concurrent execution of the process for a child node.

If the selected child node corresponds to an operator that is not optimizable (206), then it is evaluated in a default manner (212). For example, if the child node refers to an arithmetic operator such as '+' or '−', then the child operator is not evaluated using the top-down approach. Such operators may be evaluated, for example, using the bottom-up approach.

The output from these operators can be placed in a temporary storage location and used by the parent node to generate an output to the data stream (214). Depending upon the type of output produced or type of operator at the parent node and whether the output is suitable for streaming, the output from the non-optimizable node may sometimes be directly placed in the data stream. If the selected child node is not an operator, then the data at the child is directly placed in the data stream (214).

It is noted that when processing an operator that is not optimizable, it is possible that sub-children of that node may be optimizable. According to an embodiment, the optimizable sub-children may themselves call the present process to perform top-down processing for the relevant portions of the expression tree. Therefore, different types of processing may be used at different levels of the operator tree.

A determination is made whether any more child nodes exist for the present operation (216). If so, then the process returns back to 203 to process the additional child node. If there are no more child nodes to process, and if the current operator created the data stream, then the data stream is closed.

To illustrate this process, consider the following expression:

Concat((Concat(Concat('ABC', 'DEF'), 'HIJ')), (1+2))

For the purposes of this example, assume the function Concat (a, b) performs the action of concatenating the values of a and b together. Further assume that this function is capable of concatenating numerical values along with string values.

Figure 3A:
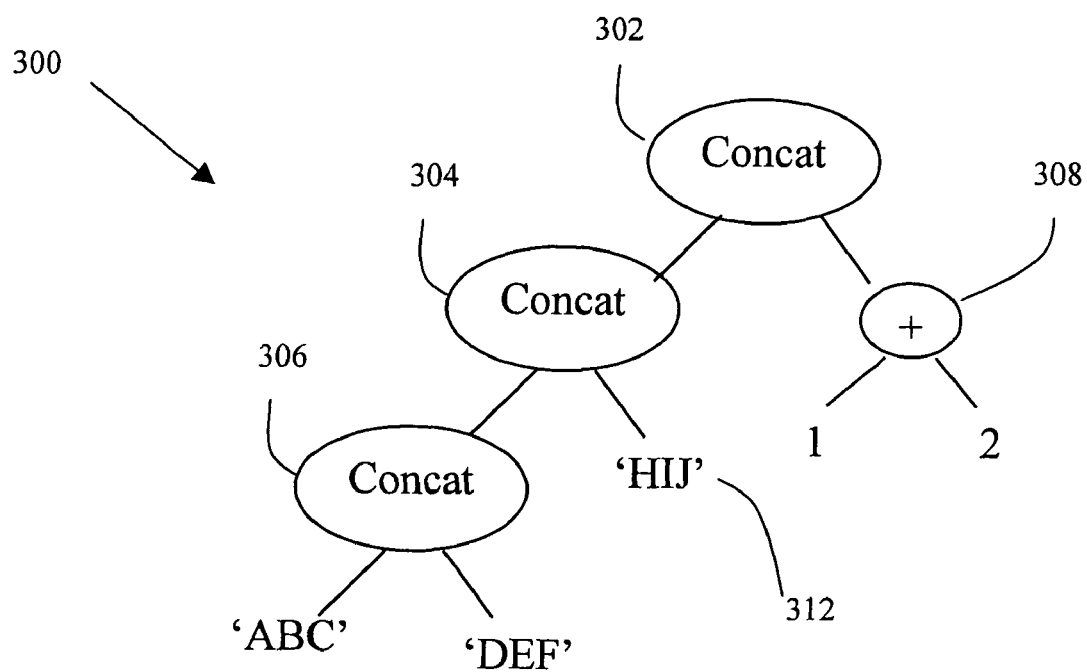
FIG. 3A shows another example expression tree.

FIG. 3A shows an example operator tree 300 corresponding to this expression. Node 302 is the top-most node, which corresponds to a Concat( ) function having a first child node 304 and a second child node 308. Child node 308 corresponds to the '+' operator. Child 304 corresponds to another Concat( ) function having a first sub-child node 306 and a second child corresponding to the value 'HIJ'. The sub-child node 306 corresponds to the Concat( ) function with inputs values of 'ABC' and 'DEF'.

FIG. 3B illustrates how the method of FIG. 2 can be applied to optimize the processing of this expression. For the sake of explanation, assume that the Concat( ) function is an optimizable operator that can be processed in a top-down manner, in which each data argument to the function can be output to a stream in its proper order. The process begin at the node 302, where a first determination is made regarding the existence of a data stream. A data stream is created if it does not yet exist.

Next, a determination is made whether any child node to node 302 is an optimizable operator. Here, the first child node 304 corresponds to the Concat( ) function, which is an optimizable operator. Therefore, the process proceeds to node 304 and another execution of the process is recursively called.

At the recursive processing for node 304, a determination is made regarding the existence of a data stream. Here, the data stream created with respect to node 302 can be passed to the recursive processing for its child node 304. Therefore, a new data stream does not have to be created. Next, a determination is made whether a first sub-child node exists with respect to node 304 that is itself an optimizable operator. Here, the first sub-child node 306 corresponds to the Concat( ) function, which is an optimizable operator. Therefore, the process proceeds to node 306 and another execution of the process is recursively called.

At the recursive processing for node 306, another determination is made regarding the existence of a data stream. The data stream had already been created with respect to node 302, which has been passed to the recursive processing for node 304, and will again be passed to the recursive processing for node 306. Thus, a new data stream does not have to be created.

Next, a determination is made whether a first sub-child node exists with respect to node 306 that is itself an optimizable operator. There are no child nodes to node 306 that corresponds to an optimizable operator. Therefore, the process performs normal processing of the Concat( ) function corresponding to node 306 but places the output to the data stream. The input data values for node 306 'ABC' and 'DEF' are output to the data stream, without requiring these values or the concatenated results to be placed in a temporary storage location or buffer.

At this point, the data stream includes the following: 'ABCDEF'.

Once processing for node 306 has been completed, the processing return back to its parent node 304. A determination is made whether any more child nodes exist for node 304 which are themselves optimizable operators. There are no additional child nodes to node 304 that corresponds to an optimizable operator. The process continues normal processing of the Concat( ) function corresponding to node 304 that places the input value 'HIJ' from child 312 directly to the data stream, without requiring this value or the concatenated results of the node to be placed in a temporary storage location or buffer.

At this point, the data stream has the following: 'ABCDEFHIJ'.

Once processing for node 304 has been completed, the processing returns back to its parent node 302. A determination is made whether any more child nodes exist for node 302 which are themselves optimizable operators. There are no additional child nodes to node 302 that corresponds to an optimizable operator.

However, the other child node 308 to parent node 302 corresponds to an operator that is not to be optimized in a top-down manner. Therefore, the operator at node 308 is evaluated in another appropriate or default manner, e.g., using the bottom-up approach. The (1+2) expression rooted at node 308 is evaluated to generate the result 3 which is placed in a temporary storage location, e.g., a buffer. The concat( ) operator at the parent node 302 takes the result "3" from the buffer and outputs this value to the data stream.

At the end of this processing, the data stream now has the following: 'ABCDEFHIJ3'.

Therefore, it can be seen that the present process can be configured to allow both top-down and bottom-up processing for the same expression. If node 308 itself contains sub-child nodes that correspond to optimizable operators, then those operators can also be evaluated using the present optimizing process.

Figure 3C:
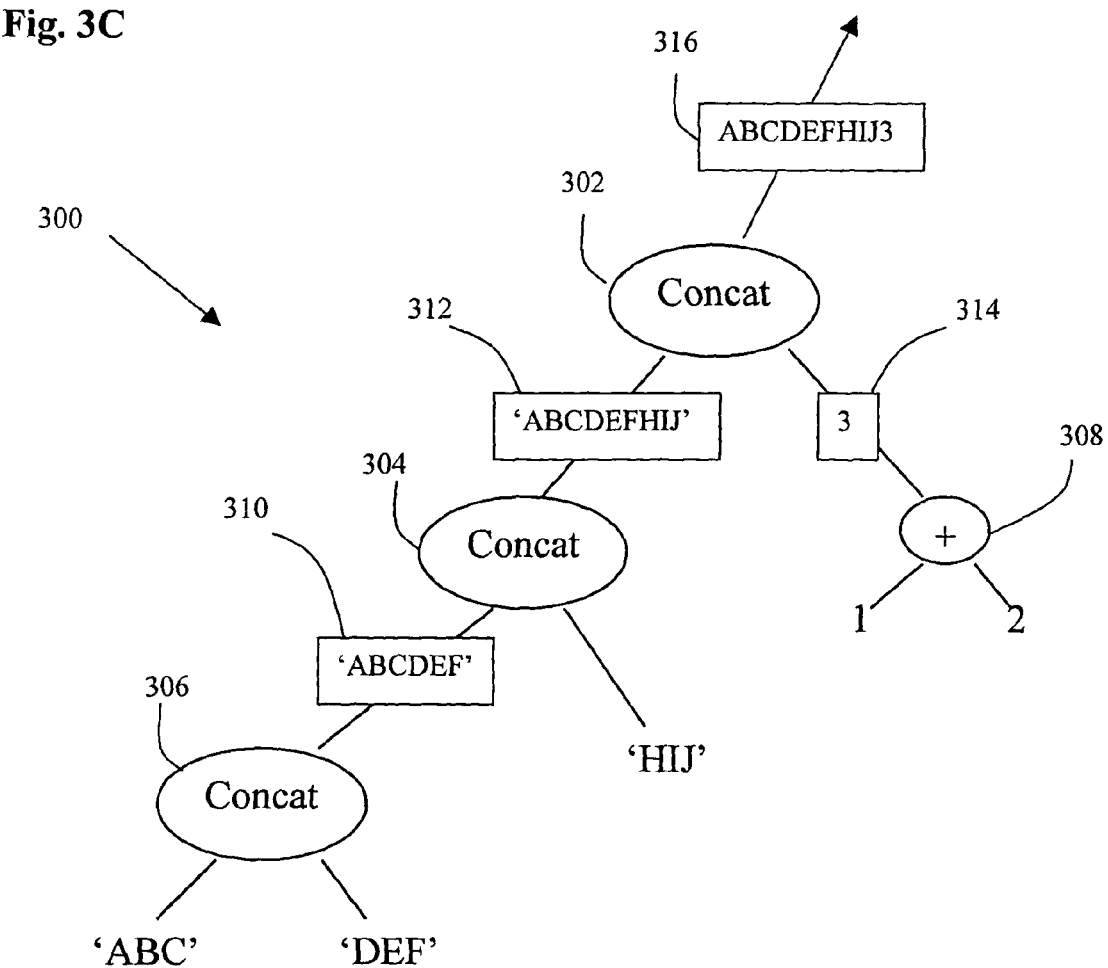
FIG. 3C illustrates a bottom-up approach to processing the expression tree of FIG. 3A.

To highlight and contrast some of the advantages of this process, reference is made to FIG. 3C which illustrates how this same expression could be evaluated using only the bottom-up approach. In this type of approach, the lower levels of the tree 300 are evaluated first, with intermediate results parked in temporary storage locations that are available to be accessed by operators at higher levels of the tree 300.

For the present expression, the lowest level of the tree 300 involves evaluation of node 306 corresponding to a Concat( ) function to concatenate the 'ABC' and 'DEF' values. The result of this evaluation is the 'ABCDEF' value which becomes an input to node 304 at a higher level of the expression tree 300. This value 'ABCDEF' is buffered at a temporary storage location 310.

The next higher level of the expression tree 300 at node 304 is now evaluated. Node 304 corresponds to a Concat( ) function that concatenates the output from node 306 with the value 'HIJ'. For this type of bottom-up processing, this means that the a concatenation operation is performed against the stored output value 'ABCDEF' from node 306 at storage location 310 with the data value 'HIJ' to produce the output value 'ABCDEFHIJ'. This intermediate output value will become an input to an operator at the parent node 302 at a higher level of the expression tree. This value 'ABCDEFHIJ' is buffered at a temporary storage location 312.

At this same level of the expression tree 300, the operator at node 308 is now evaluated. Node 308 corresponds to a '+' operation that adds the input values 1 and 2. This produces an intermediate output value of 3 which will become an input to an operator at the parent node 302 at a higher level of the expression tree. The intermediate value 3 is buffered at a temporary storage location 314.

The next higher level of the expression tree 300 at node 302 is now evaluated. Node 302 corresponds to a Concat( ) function that concatenates the output from node 304 with the result of the operator at node 308. This means that a concatenation operation is performed against the stored output value 'ABCDEFHIJ' from node 304 at storage location 312 with the stored value 3 from node 308 at storage location 314. Therefore, the Concat( ) operator at node 302 will produce an output value of 'ABCDEFHIJ3' which may itself be placed in a temporary storage location 316.

FIG. 3C highlights several significant disadvantages with the bottom-up approach. First, the bottom-up approach will require intermediate results to be generated and stored into temporary storage locations, such as storage locations 310 and 312. For a complex expression, a significant amount of system resources may be required to perform the actions of copying to and reading from these storage locations, in addition to the expense related to allocating these storage locations. Moreover, it is noted that the exact same data values are copied numerous times throughout this process. For example, the 'ABC' and 'DEF' values are repeated at storage locations 310, 312, and 316. The 'HIJ' data value is repeated at storage locations 312 and 316. Repeating the same data values in different storage locations in this manner is highly inefficient and could consume an excessive amount of system resources. This is particularly true for complex expressions having numerous levels of operators, where values may be repeated, for example, on a linear basis O(d) where d is the depth of the operator tree.

In contrast, the approach of the present embodiment of the invention is performed with zero or minimum buffering of intermediate results, since intermediate data is directly placed in the output data stream. Even data that cannot or should not be streamed is copied fewer times using this process. The data stream can be configured to be any location or structure, such as an HTTP stream, buffer, large object (LOB), or even the intended persistent location for the data (so that a data copy to that location does not have to be performed). Examples of other types of streams that could be built upon include a segmented array, data socket, pipe, files, and networking/internet streams such as an FTP stream.

The present invention is particularly useful for handling arbitrarily sized XML in a SQL operator tree. This type of processing may occur, for example, when making SQL/XML calls to generate XML from a relational database. As noted above, SQL/XML is a standard that lays out a set of operators for generating XML from a relational database.

An example SQL/XML call that performs this type of processing is the XMLElement( ) function. Based upon an input value, the XMLElement function generates an XML element. For example, the following SQL statement using this function:

```
SELECT XMLElement( "Element", column_value )
FROM Example_Table;
``` that access the following Example Table:

| Column_Value |
| --- |
| 2 |
| 3 | will read each row from this example table, apply the XMLElement function to that row to create an XML element, and output each generated XML element as follows:

```
<Element> 2 </Element>
<Element> 3 </Element>
```

In typical usage, when this type of operator is used to generate XML, multiple levels of nesting may occur because of the complex types, schemas, and formats of data that is normally used by modern organizations and businesses. When using the bottom-up approach to handle an expression tree corresponding to this nesting of XMLElement( ) operators, it is quite possible that the same data will be copied, buffered, and propagated through multiple levels of the expression tree. As is evident, this type of bottom-up approach could be quite inefficient.

Figure 4:
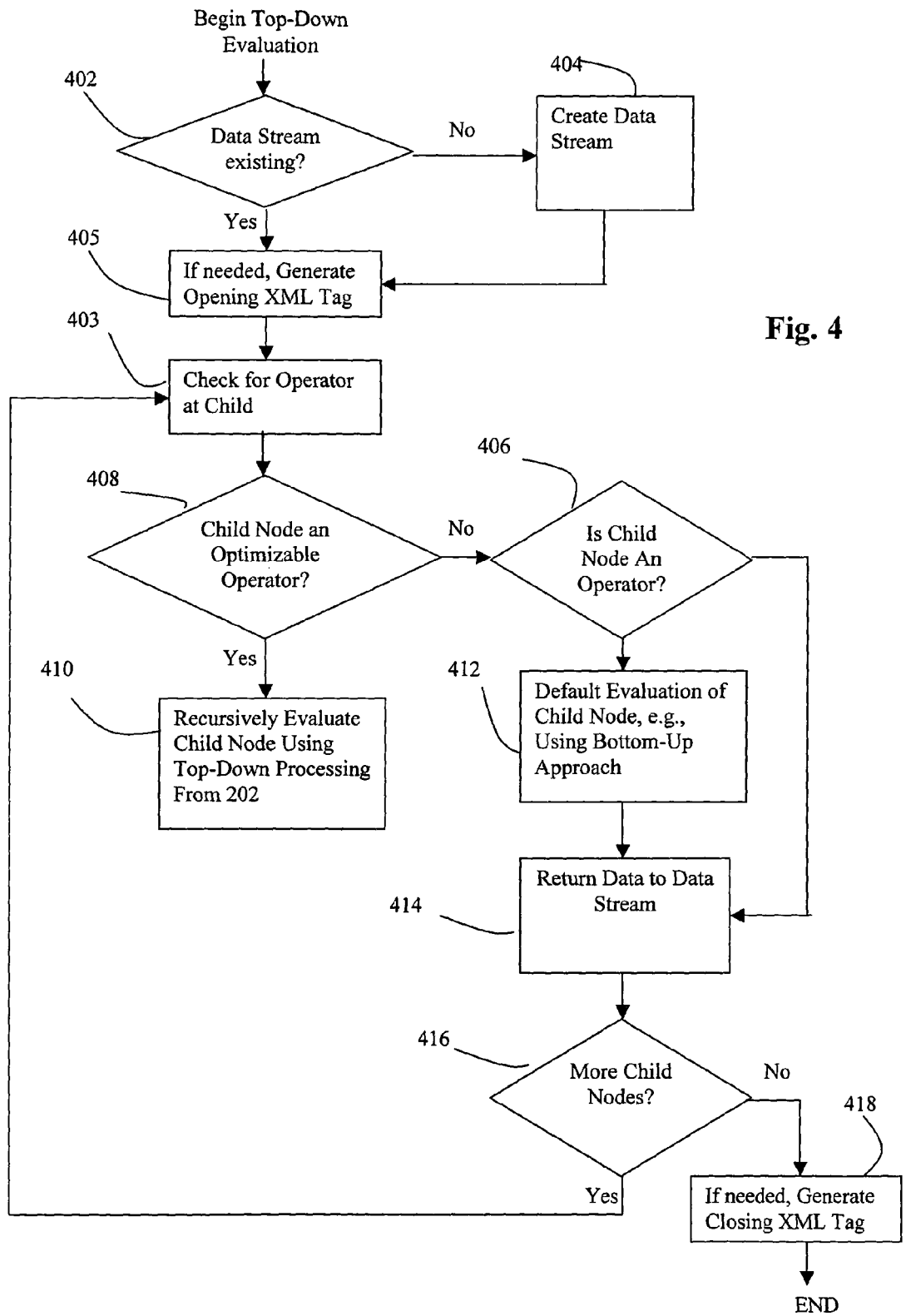
FIG. 4 depicts a flowchart of a process for processing handling XML in a SQL-based operator tree.

FIG. 4 shows a flowchart of a process that can be used to generate XML from a SQL operator tree, e.g., for a statement or expression that uses this or a similar type of SQL/XML operator. At 402, a determination is made whether an already-existing data stream has been identified to the evaluation function. If not, then a new data stream is created at 404. This stream can be created over any structure or location, depending upon the context in which the invention is used, including for example, a buffer, LOB, segmented array, data socket, pipe, files, and networking/internet streams such as an FTP stream or HTTP stream.

A determination can be made whether an opening XML tag needs to be generated. If so, then an opening XML tag is generated at 405. For example, the XMLElement( ) functions generates this tag to satisfy the syntactic requirement of XML for a representation of an element. If the operator is XMLElement("A", op) where op is some further operator tree, then "<A>" is printed.

At 403, a child of the XML-based operator is identified and reviewed. A determination is made whether the selected child node corresponds to an optimizable operator (408). For purposes of the present embodiment, optimizable operators are those operators which can be evaluated in a top-down manner. An example of such an optimizable operator includes SQL/XML operators such as XMLElement( ), XMLAgg( ), XMLConcat( ), XMLForest( ), XMLAttribute( ), XMLComment( ), XMLPI( ), and other operators that may be created for this SQL/XML standard or other standards in the future. Other examples of optimizable operators include, for example, a concatenation operator or a CASE WHEN statement on top of a SQL/XML operator. In addition, other operators that return values linearly, e.g., operators that linearly return XML values to a buffer, could also qualify as optimizable operators. If the selected operator is an optimizable operator, then a new execution of the process (beginning again at 402) is implemented for the child operator. This can be implemented by recursively calling the evaluation function while passing an identification of the present data stream (410).

If the selected child node corresponds to an operator that is not optimizable (406), then it is evaluated in a default manner (412). According to an embodiment, this includes column data and non-optimizable operators. These child nodes are evaluated in the normal way, and the data is copied in. The output from these operators can be placed in a temporary storage location and used by the parent node to generate an output to the data stream (414). Depending upon the type of output produced or type of operator at the parent node and whether the output is suitable for streaming, the output from the non-optimizable node may sometimes be directly placed in the data stream. If the selected child node is not an operator, then the data at the child is directly placed in the data stream (414).

A determination is made whether any more child nodes exist for the present operation (416). If so, then the process returns back to 403 to process the additional child node.

Once all child nodes have been processed, a determination is made whether a closing XML tag is needed. If so, then the appropriate closing XML tag is generated at 418. For example, if the operator is XMLElement("A", op) where op is some further operator tree, then "</A>" is printed.

At this point, if the current operator created the data stream, then the data stream is closed.

Consider if it is desired to generate an XML document relating to purchase orders used by a fictional company, with the XML data having the following structure:

```
<PurchaseOrder>
    <OrderNo> Value_of_Order_Number </OrderNo>
    <Address>
        <State> Value_of_State </State>
        <City> Value_of_City </City>
    </Address>
</PurchaseOrder>
```

Assume that the following SQL statement is used to generate this type of XML:

```
SELECT XMLElement ( "PurchaseOrder",
    XMLElement ( "OrderNo", OrderNoVal),
    XMLElement ( "Address",
        XMLElement ( "State", StateVal),
        XMLElement ( "City", CityVal)
    )
)
FROM Example_Table_2;
```

An example table that is accessed by this statement may have the following column structure:

| OrderNoVal | StateVal | CityVal |
| --- | --- | --- |

Figure 5:
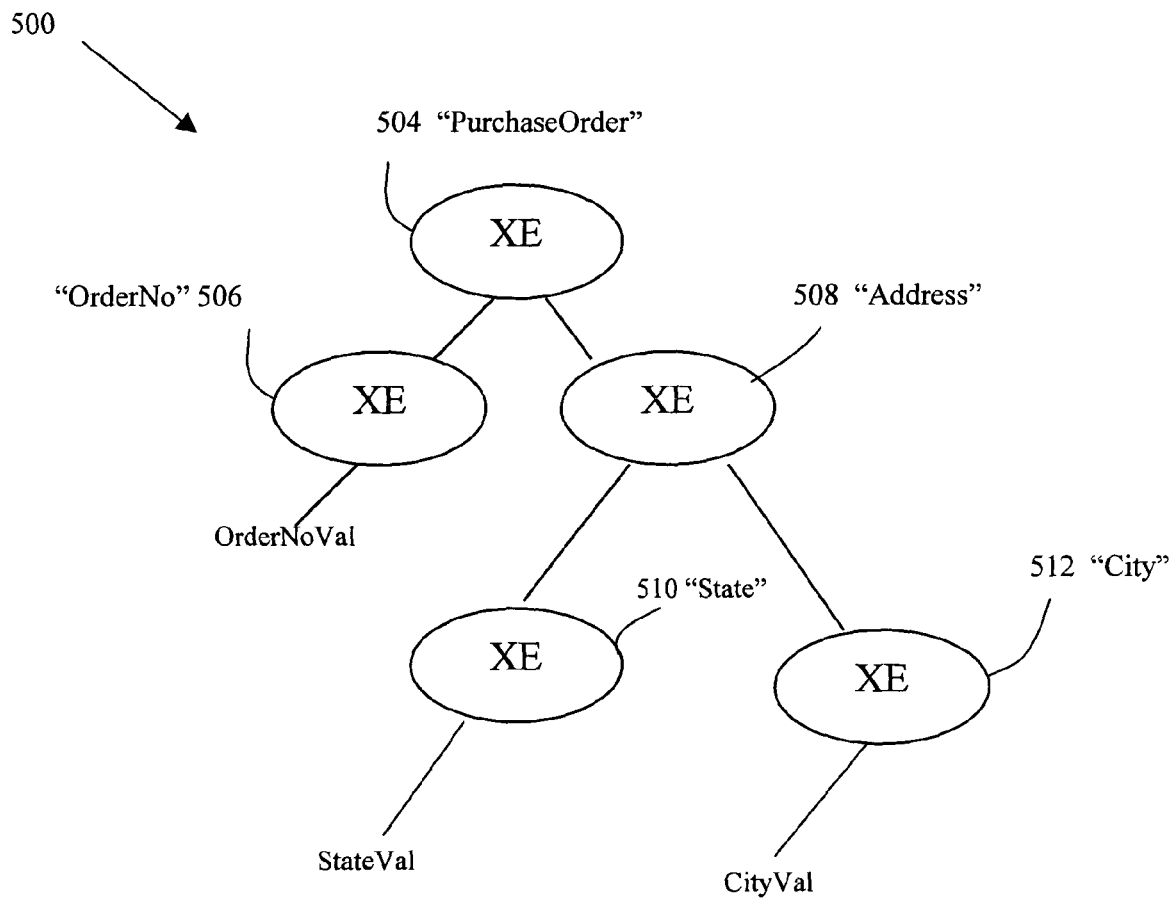
FIG. 5 shows an example SQL-based operator tree for XML.

FIG. 5 shows an example operator tree 500 that corresponds to this SQL statement. In operator tree 500, node 504 corresponds to the main XMLElement( ) operator for the "PurchaseOrder" element. Node 506 corresponds to the XMLElement( ) operator for the "OrderNo" element. Node 508 corresponds to the XMLElement( ) operator for the "Address" element, with its child-nodes 510 and 512 corresponding to the XMLElement( ) operator for the "State" and "City" elements, respectively.

Figure 6B:
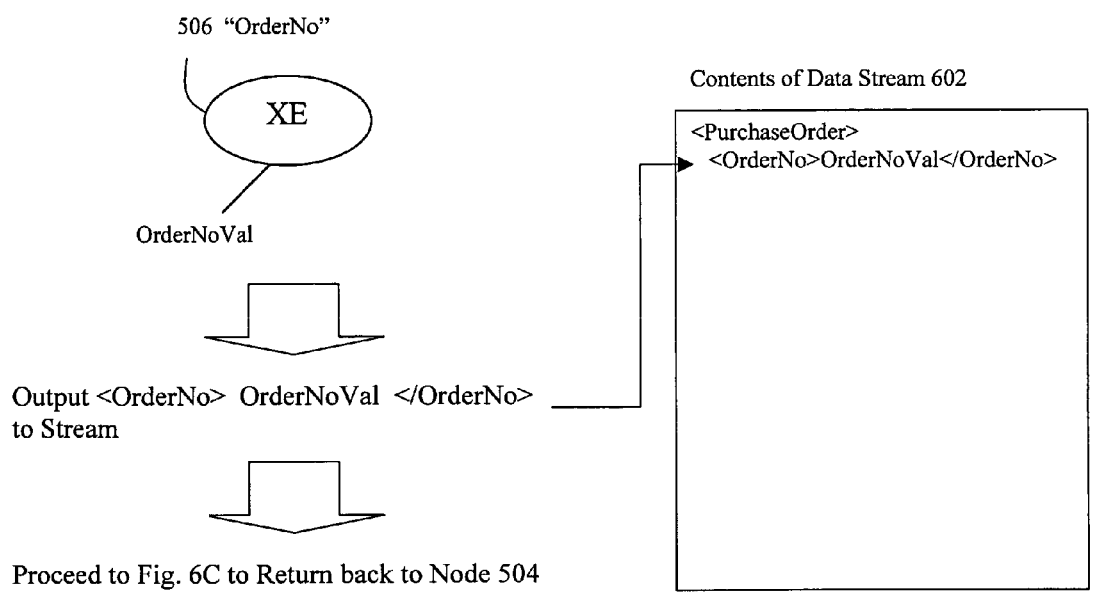

FIGS. 6A-I illustrate how the process of FIG. 4 can be used to evaluate operator tree 500. Referring to FIG. 6A, the process begins by starting the evaluation of the top-level node 504. An initial determination is made regarding the existence of a data stream. Assume that a data stream does not yet exist, and therefore data stream 602 is created.

Because node 504 relates to the XMLElement( ) operator, an opening XML tag is created and placed in the data stream. For this example, the opening XML tag is the following: "<PurchaseOrder>".

A determination is made whether node 504 corresponds to any child nodes. Here a node 506 is a first child node to parent node 504. A determination is made whether node 506 corresponds to an optimizable operator. In this example, node 506 corresponds to the XMLElement( ) operator, which is an optimizable operator. Therefore, the operator corresponding to node 506 is called and the present data stream 602 is passed to the processing of node 506.

FIG. 6B illustrates the initial processing of node 506, which corresponds to the XMLElement( ) operator for the "OrderNo" element. An opening XML tag is generated and placed in the data stream 602 that corresponds to this element, as follows: "<OrderNo>". Next, a determination is made whether any child node to node 506 is an optimizable operator. Here, the only child to node 506 is a value (i.e., OrderNoVal) from a database column. The data value for the OrderNoVal column is retrieved and placed in the data stream 602. Since there are no further children for node 506, a closing XML tag is generated as follows: "</OrderNo>".

Figure 6C:
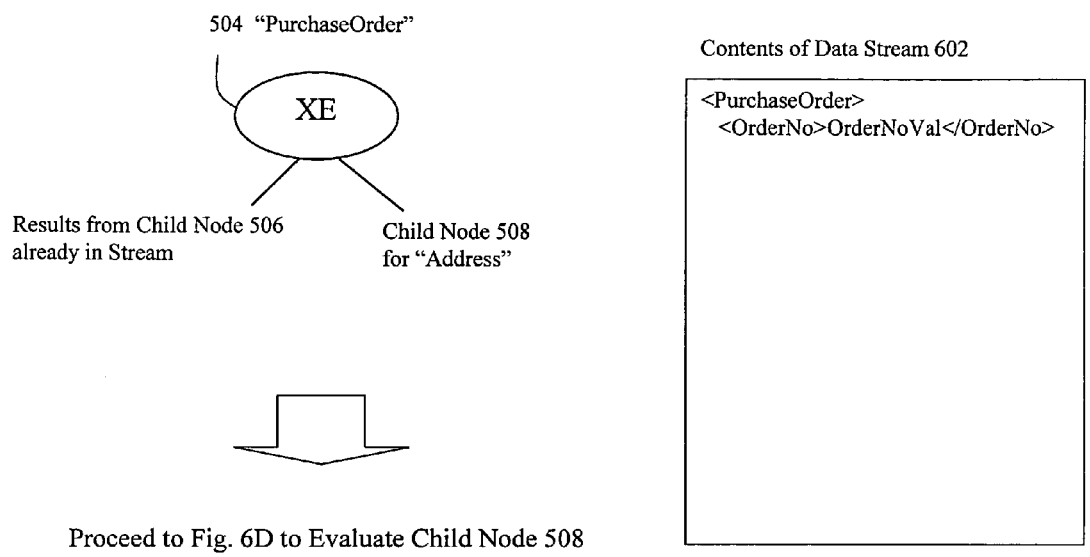

Referring to FIG. 6C, the process returns back to parent node 504. A determination is made whether node 504 is associated with any more child nodes. In this example, node 508 is another child node to parent node 504. A determination is made whether node 508 corresponds to an optimizable operator. In this example, node 508 corresponds to the XMLElement( ) operator, which is an optimizable operator. The operator corresponding to node 508 is called and the present data stream 602 is passed to the processing of node 508.

Turning to FIG. 6D, processing for node 508 will begin. Because node 508 relates to the XMLElement( ) operator for the "Address" element, an opening XML tag is created and placed in the data stream. For this example, the opening XML tag is the following: "<Address>".

A determination is made whether node 508 corresponds to any child nodes. A node 510 is a first child node to node 508. A determination is made whether node 510 corresponds to an optimizable operator. In this example, node 510 corresponds to the XMLElement( ) operator, which is an optimizable operator. Therefore, the operator corresponding to node 510 is called and the present data stream 602 is passed to the processing of node 510.

FIG. 6E illustrates the processing of node 510, which corresponds to the XMLElement( ) operator for the "State" element. An opening XML tag is generated and placed in the data stream 602 that corresponds to this element, as follows: "<State>". Next, a determination is made whether any child node to node 510 is an optimizable operator. Here, the only child to node 510 is a value (i.e., StateVal) from a database column. The data value for the StateVal column is retrieved and placed in the data stream 602. Since there are no further children for node 510, a closing XML tag is generated as follows: "</State>".

Referring to FIG. 6F, the process returns back to node 508. A determination is made whether node 508 is associated with any more child nodes. In this example, node 508 is another child node 512. In this example, node 512 corresponds to the XMLElement( ) operator, which is an optimizable operator. Therefore, the operator corresponding to node 512 is called and the present data stream 602 is passed to the processing of node 512.

FIG. 6G illustrates the processing of node 512, which corresponds to the XMLElement( ) operator for the "City" element. An opening XML tag is generated and placed in the data stream 602 that corresponds to this element, as follows: "<City>". Next, a determination is made whether any child node to node 512 is an optimizable operator. The only child to node 512 is a value (i.e., CityVal) from a database column. Thus, the data value for the CityVal column is retrieved and placed in the data stream 602. Since there are no further children for node 512, a closing XML tag is generated as follows: "</City>".

Referring to FIG. 6H, the process returns back to the process of node 508. A determination is made whether node 508 is associated with any more child nodes. In this example, there are no further child nodes associated with node 508. A closing XML tag is generated for node 508 as follows: "</Address>". Processing now ends for node 508, and the process returns back to its parent node 504.

FIG. 6I shows the final processing that occurs for node 504. A determination is made whether node 504 is associated with any more child nodes. In this example, there are no further child nodes associated with node 504. A closing XML tag is generated for node 508 as follows: "</PurchaseOrder>". Processing now ends for node 508, and the data stream 602 can be closed.

Therefore, what has been disclosed is an improved method and mechanism for processing expressions and operator trees. An embodiment of the invention is particularly useful to optimize processing of XML statements with respect to SQL operators. A top-down processing approach can be taken to directly output data from operators to a data stream. In addition, multiple processing approaches can be taken within a single expression tree, with some operators processed using the top-down approach and other operators processed with the bottom-up approach. Even data that can not be streamed is copied fewer times using this approach, intermediate values from bottom-up processing may still be streamed if it is used by an operator that is eligible for top-down processing.

System Architecture Overview

Figure 7:
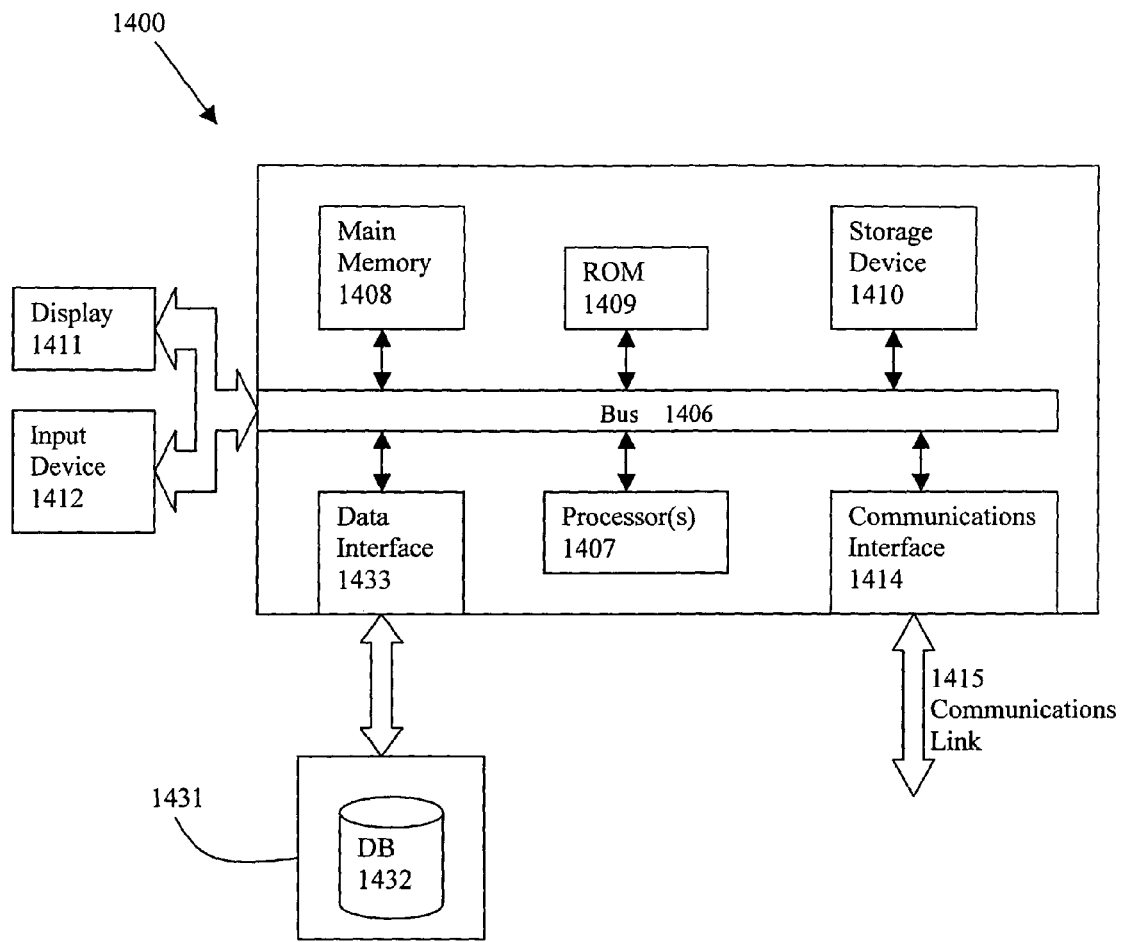
FIG. 7 is a diagram of a computer system with which the present invention can be implemented.

The execution of the sequences of instructions required to practice the invention may be performed in embodiments of the invention by a computer system 1400 as shown in FIG. 7. As used herein, the term computer system 1400 is broadly used to describe any computing device that can store and independently run one or more programs. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

Each computer system 1400 may include a communication interface 1414 coupled to the bus 1406. The communication interface 1414 provides two-way communication between computer systems 1400. The communication interface 1414 of a respective computer system 1400 transmits and receives signals, e.g., electrical, electromagnetic or optical signals, that include data streams representing various types of information, e.g., instructions, messages and data. A communication link 1415 links one computer system 1400 with another computer system 1400. A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives signals, e.g., electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407. The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407. A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer-implemented method for processing a program statement in a database query language, the program statement corresponding to a plurality of operators, wherein an operator tree is associated with the plurality of operators, the operator tree comprising a parent operator node, the method comprising:

identifying a child node that is associated with the parent operator node;

determining if the child node relates to an operator for which top-down processing is capable of being performed, wherein the top-down processing is capable of being performed when a result for the operator is capable of being generated without storage of the result for the parent operator node;

calling and executing the operator for the child node to generate a result using a processor; and outputting the result to a data stream without buffering the result or an intermediate result in storage when top-down processing is performed, thereby processing the program statement in the database query language.

2. The method of claim 1 further comprising:
determining whether the data stream already exists; and creating the data stream if it does not exist.

3. The method of claim 1 in which the program statement is intended to create XML, wherein one or more XML tags are generated.

4. The method of claim 3 in which the program statement comprises a SQL/XML operator.

5. The method of claim 4 in which the SQL/XML operator is a XMLElement( ), XMLAgg( ), XMLConcat( ), XMLForest( ), XMLAttribute( ), XMLComment( ), or XMLPI( ) operator.

6. The method of claim 1 in which nodes corresponding to a concatenate operation or a CASE WHEN statement on top of SQL/XML operator are eligible for top-down processing.

7. The method of claim 1 in which the data stream is closed after the parent operator node has been fully evaluated.

8. The method of claim 1 further comprising identifying another child operator node, wherein the another child operator node is not eligible for top-down processing.

9. The method of claim 8 in which the another child operator node is evaluated using bottom-up processing.

10. The method of claim 8 in which both top-down and bottom-up processing are used to evaluate the program statement.

11. The method of claim 1 in which the data stream is built at an intended target location.

12. The method of claim 1 in which the data stream is a single data stream.

13. The method of claim 1 in which the data stream is built on a buffer, LOB, HTTP stream, segmented array, data socket, pipe, file, internet stream type, network stream type, or FTP stream.

14. The method of claim 1 in which an intermediate copy is not stored for the output result.

15. A computer-implemented method for processing a program statement in a database query language, the program statement corresponding to a plurality of operators, wherein an operator tree can is associated with the plurality of operators, the operator tree comprising a parent operator node, the method comprising:
(a) determining whether the parent operator node is related to a first child operator node that is eligible for top-down processing, wherein the first child operator node is eligible for the top-down processing when a result for an operator associated with the first child operator node is capable of being generated without storage of the result for the parent operator node; and
(b) evaluating the first child operator node using a processor with top-down processing if the child operator is eligible for top-down processing, wherein the output from top-down processing the first child operator node is output to a data stream without buffering the result or an intermediate result in storage, thereby processing the program statement in the database query language.

16. The method of claim 15 in which the program statement is intended to create XML, wherein one or more XML tags are generated.

17. The method of claim 16 in which the program statement comprises a SQL/XML operator.

18. The method of claim 17 in which the SQL/XML operator is a XMLElement( ), XMLAgg( ), XMLConcat( ), XMLForest( ), XMLAttribute( ), XMLComment( ), or XMLPI( ) operator.

19. The method of claim 15 in which nodes corresponding to a concatenate operation or a CASE WHEN statement over a SQL/XML operator are eligible for top-down processing.

20. The method of claim 15 in which an intermediate copy is not stored for the output from the first child operator node.

21. The method of claim 15 in which a second child operator node is identified which is not eligible for top-down processing.

22. The method of claim 21 in which the second child operator node not eligible for top-down processing is evaluated using bottom-up processing.

23. The method of claim 15 in which the data stream is built at an intended target location for the output from the first child operator node.

24. The method of claim 15 in which the data stream is a single data stream.

25. The method of claim 15 in which the data stream is built on a buffer, LOB, HTTP stream, segmented array, data socket, pipe, file, internet stream type, network stream type, or FTP stream.

26. A computer program product comprising a computer usable medium having executable code to execute a process for processing a program statement in a database query language, the computer usable medium comprising a volatile or non-volatile medium, the program statement corresponding to a plurality of operators, wherein an operator tree is associated with the plurality of operators, the operator tree comprising a parent operator node, the process comprising:
identifying a child node that is associated with the parent operator node;
determining if the child node relates to an operator for which top-down processing is capable of being performed, wherein the top-down processing is capable of being performed when a result for the operator is capable of being generated without storage of the result for the parent operator node;
calling and executing the operator for the child node to generate a result; and
outputting the result to a data stream without buffering the result or an intermediate result in storage, thereby processing the program statement in the database query language.

27. A system for processing a program statement in a database query language, the program statement corresponding to a plurality of operators, wherein an operator tree is associated with the plurality of operators, the operator tree comprising a parent operator node, the system comprising:
means for identifying a child node that is associated with the parent node;
means for determining if the child node relates to an operator for which top-down processing is capable of being performed, wherein the top-down processing is capable of being performed when a result for the operator is capable of being generated without storage of the result for the parent operator node;
means for calling and executing the operator for the child to generate a result; and
means for outputting the result to a data stream without buffering the result or an intermediate result in storage, thereby processing the program statement in the database query language.

28. A computer program product comprising a computer usable medium having executable code to execute a process for processing a program statement in a database query language, the computer usable medium comprising a volatile or non-volatile medium, the program statement corresponding to a plurality of operators, wherein an operator tree is associated with the plurality of operators, the operator tree comprising a parent operator node, the process comprising:
  (a) determining whether the parent operator node is related to a first child operator node that is eligible for top-down processing, wherein the first child operator node is eligible for the top-down processing when a result for an operator associated with the first child operator node is capable of being generated without storage of the result for the parent operator node; and
  (b) evaluating the first child operator node with top-down processing if the child operator is eligible for top-down processing, wherein the result from the first child operator node is output to a data stream without buffering the result or an intermediate result in storage, thereby processing the program statement in the database query language.

29. A system for processing a program statement in a database query language, the program statement corresponding to a plurality of operators, wherein an operator tree is associated with the plurality of operators, the operator tree comprising a parent operator node, the system comprising:
  (a) means for determining whether the parent operator node is related to a first child operator node that is eligible for top-down processing, wherein the first child operator node is eligible for the top-down processing when a result for an operator associated with the first child operator node is capable of being generated without storage of the result for the parent operator node; and
  (b) means for evaluating the first child operator node with top-down processing if the child operator is eligible for top-down processing, wherein the result from the first child operator node is output to a data stream without buffering the result or an intermediate result in storage, thereby processing the program statement in the database query language.

30. The computer program product of claim 26, wherein the program statement is intended to create XML, wherein one or more XML tags are generated.

31. The computer program product of claim 30, wherein the program statement comprises a SQL/XML operator.

32. The computer program product of claim 31, wherein the SQL/XML operator is a XMLElement( ), XMLAgg( ), XMLConcat( ), XMLForest( ), XMLAttribute( ), XMLComment( ), or XMLPI( )operator.

33. The system of claim 27, wherein the program statement is intended to create XML, wherein one or more XML tags are generated.

34. The system of claim 33, wherein the program statement comprises a SQL/XML operator.

35. The system of claim 34, wherein the SQL/XML operator is a XMLElement( ), XMLAgg( ), XMLConcat( ), XMLForest( ), XMLAttribute( ), XMLComment( ), or XMLPI( ) operator.

36. The computer program product of claim 28, wherein the program statement is intended to create XML, wherein one or more XML tags are generated.

37. The computer program product of claim 36, wherein the program statement comprises a SQL/XML operator.

38. The computer program product of claim 37, wherein the SQL/XML operator is a XMLElement( ), XMLAgg( ), XMLConcat( ), XMLForest( ), XMLAttribute( ), XMLComment( ), or XMLPI( ) operator.

39. The system of claim 29, wherein the program statement is intended to create XML, wherein one or more XML tags are generated.

40. The system of claim 39, wherein the program statement comprises a SQL/XML operator.

41. The system of claim 40, wherein the SQL/XML operator is a XMLElement( ), XMLAgg( ), XMLConcat( ), XMLForest( ), XMLAttribute( ), XMLComment( ), or XMLPI( ) operator.

42. The system of claim 27, further comprising a volatile or non-volatile medium for storing information regarding the child node.

43. The system of claim 29, further comprising a volatile or non-volatile medium for storing information regarding the first child node.

* * * * *

UNITED STATES PATENT AND TRADEMARK OFFICE
CERTIFICATE OF CORRECTION

| | | |
|---|---|---|
| PATENT NO. | : 7,873,645 B2 | Page 1 of 1 |
| APPLICATION NO. | : 10/656800 | |
| DATED | : January 18, 2011 | |
| INVENTOR(S) | : James W. Warner et al. | |

It is certified that error appears in the above-identified patent and that said Letters Patent is hereby corrected as shown below:

On Title Page 2, under Item (56) "Other Publications", line 34, delete "Database" and insert -- Databases --, therefor.

On Title page 2, under Item (56) "Other Publications", line 47, delete "Techology" and insert -- Technology --, therefor.

In column 1, line 63, delete "out put" and insert -- output --, therefor.

In column 3, line 16, delete "FIG. 6A-I" and insert -- FIGS. 6A-I --, therefor.

In column 6, line 14, delete "the a" and insert -- a --, therefor.

In column 16, line 4, in claim 32, delete "XMLPI( )operator." and insert -- XMLPI( ) operator. --, therefor.

Signed and Sealed this

Thirteenth Day of September, 2011

David J. Kappos
*Director of the United States Patent and Trademark Office*